United States Patent [19]
Masikewich et al.

[11] Patent Number: 5,877,126
[45] Date of Patent: Mar. 2, 1999

[54] METHOD OF REDUCING FORMATION DAMAGE WHEN DRILLING FOR OIL AND GAS

[75] Inventors: James Darrell Masikewich, Calgary, Canada; Peter Lawrence Churcher, North Richland Hills, Tex.; Douglas Brant Bennion, Calgary, Canada

[73] Assignee: Q'Max Solutions Inc., Calgary, Canada

[21] Appl. No.: 893,048

[22] Filed: Jul. 14, 1997

[30] Foreign Application Priority Data

Sep. 23, 1996 [CA] Canada ................................ 2168203

[51] Int. Cl.⁶ .............................. C09K 7/00; C09K 7/02
[52] U.S. Cl. ............................................ 507/139; 507/266
[58] Field of Search ..................................... 507/139, 266

[56] References Cited

U.S. PATENT DOCUMENTS

| | | | |
|---|---|---|---|
| 4,064,055 | 12/1977 | Carney ...................................... | 252/8.5 |
| 4,409,108 | 10/1983 | Carney et al. ........................... | 252/8.5 |
| 5,008,026 | 4/1991 | Gardner et al. . | |
| 5,152,907 | 10/1992 | Dulaney et al. ....................... | 252/8.552 |
| 5,361,841 | 11/1994 | Hale et al. ............................... | 507/139 |
| 5,361,842 | 11/1994 | Hale et al. ............................... | 507/139 |
| 5,436,227 | 7/1995 | Hale et al. ............................... | 507/139 |

OTHER PUBLICATIONS

Reductions in the Productivity of Oil & Gas Reservoirs due to Aqueous Phase Trapping by D. Brant Bennion, Mauro F. Cimolal, Ronald F. Bletz, F. Brent Thomas, Petroleum Society of CIM, Paper No. CIM 93–24, p1–10 (13 pages in total with figures and tables), May 1993.

Properly designed underbalanced drilling fluids can limit formation damages, P. L. Churcher, Fred J. Yurkiw, Ron F. Bietz, D. Brant Bennion, Oil and Gas Journal, Apr. 29, 1996, pp. 50–55.

Underbalanced Drilling, Praises and Perils, D. Brant Bennion, F. Brent Thomas, Ronald F. Bietz and Douglas G. Bennion, SPE 35242, paper presented at SPE Permian Basin Oil and Gas Recovery Conference, Mar., 1996, Midland Texas, 13 pages.

*Primary Examiner*—Philip Tucker
*Attorney, Agent, or Firm*—Anthony R. Lambert

[57] ABSTRACT

A method of reducing formation damage when drilling for oil and gas. Firstly, determining initial water, hydrocarbon and gas saturation in the porous formation under consideration. Secondly, determining a preferential wettability of the porous formation. Thirdly, determining potential damaging effects due to aqueous phase trapping as a result of increasing water saturation in the porous formation. Fourthly, determining an alcohol type and concentration that will reduce severity of aqueous phase trapping. Fifthly, incorporating the alcohol type and concentration into a drilling fluid. The alcohol concentration will not less than 1% of the volume of the drilling fluid. Sixthly, pumping the drilling fluid containing the alcohol down a drilling string to a drill bit during drilling operations. The described method reduces invasive damage caused by drilling fluid entering the formation.

3 Claims, 1 Drawing Sheet

METHOD OF REDUCING FORMATION DAMAGE WHEN DRILLING FOR OIL AND GAS

FIELD OF THE INVENTION

The present invention relates to a method of reducing formation damage when drilling for oil and gas

BACKGROUND OF THE INVENTION

Oil and gas operators drilling vertical or near vertical wellbores into production zones, usually lower steel production casing into the wellbore across the production zone and permanently cement it in place. The steel casing and cement are then perforated to allow hydrocarbon fluids to flow into the wellbore. These perforations are normally sufficient in length to penetrate beyond an zone of drilling induced damage to the production zone rock.

Damage to production zones can occur when the reservoir is penetrated in an "overbalanced" situation. In an "overbalanced" situation the hydrostatic pressure created by the annular column of drilling fluid exceeds the pressure in the reservoir. This is in contrast to an "underbalanced" situation where this same hydrostatic pressure is less than the reservoir pressure. In an "underbalanced" situation, reservoir fluids freely flow into the wellbore while the production zone is being penetrated.

Some of the problems associated with underbalanced drilling are outlined in a paper entitled "Underbalanced Drilling, Praises and Perils" presented by D. Brant Bennion, F. Brent Thomas, Ronald F. Beitz, and Douglas W. Bennion to the Society of Petroleum Engineers at a conference in Midland, Tex. in March of 1996 (SPE paper #35242).

Increasingly operators are drilling into production zones horizontally. Often steel casing and cement are not placed into the production zone. This is termed an "open hole" completion. It is difficult and expensive to perforate an open hole completion. It is, therefore, important to avoid damaging the production rock surrounding the wellbore while drilling through it.

Many kinds of damage mechanisms have been identified. An "aqueous phase trap", also called a "water block", occurs when water or "filtrate" (the liquid phase of the drilling fluid) enters the production zone. This filtrate fills up pore spaced normally occupied by gas or oil, reducing the permeability to the gas or oil. It is difficult or impossible to extract all of the filtrate such that the original permeability is restored. The zone is permanently damaged. Aqueous phase trapping is discussed in a paper entitled "Reduction in the Productivity of Oil and Gas Reservoirs Due to Aqueous Phase Trapping" by D. Brant Bennion, Mauro P. Camolai, Ronald F. Bietz and F. Brent Thomas; presented to the Petroleum Society of CIM in Calgary May 1993 (CIM paper #CIM93-24).

SUMMARY OF THE INVENTION

What is required is a method of reducing formation damage when drilling for oil and gas.

According to the present invention there is provided a method of reducing formation damage when drilling for oil and gas. Firstly, determining initial water, hydrocarbon and gas saturation in the porous formation under consideration. Secondly, determining a preferential wettability of the porous formation. Thirdly, determining potential damaging effects due to aqueous phase trapping as a result of increasing water saturation in the porous formation. Fourthly, determining an alcohol type and concentration that will reduce severity of aqueous phase trapping. Fifthly, incorporating the alcohol type and concentration into a drilling fluid. The alcohol concentration will not less than 1% of the volume of the drilling fluid. Sixthly, pumping the drilling fluid containing the alcohol down a drilling string to a drill bit during drilling operations.

The method, as described above, provides significant surface tension reductions in the drilling fluid. This reduces invasive damage from drilling fluid entering the formation.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
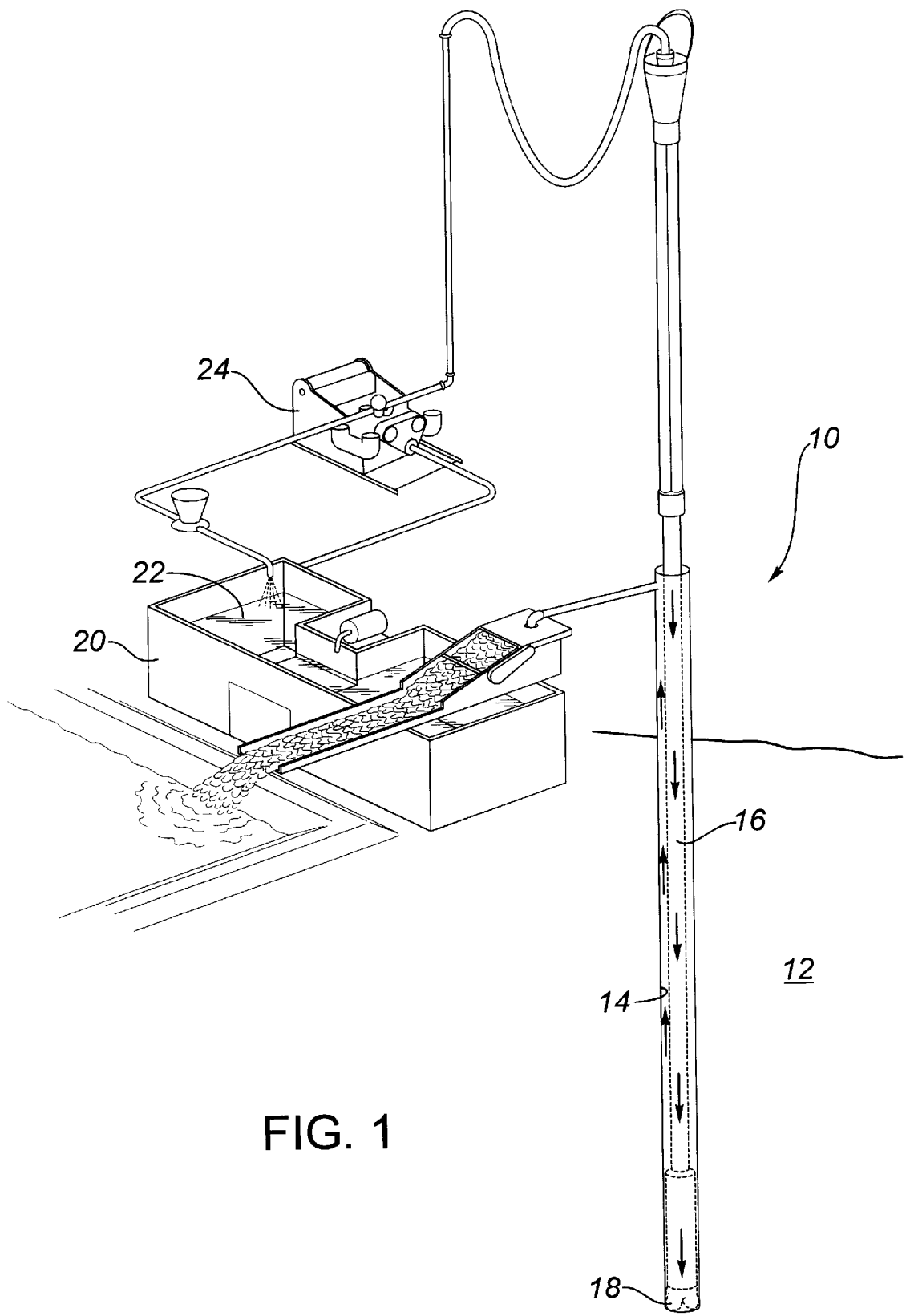
FIG. 1 is a side elevation view of an oil and gas well being drilled in accordance with the teachings of the present invention.

The preferred method of reducing formation damage when drilling for oil and gas will now be described with reference to FIG. 1.

Referring to FIG. 1, there is illustrated an oil and gas well, generally identified by reference numeral 10 which is in the process of being drilled into a porous formation 12 bearing oil and gas. Extending into porous formation 12 is a well bore 14 in which is positioned a drill string 16 at the end of which is a drill bit 18. The drill string 16 is in fluid communication with mud tanks 20 containing drilling fluid 22. Drilling fluid 22 is pumped from mud tanks 20 down drill string 16 by mud pumps 24.

The method consists of the following steps:

Firstly, determining initial water, hydrocarbon and gas saturation in the porous formation under consideration. Formations are usually either predominantly water and, as such, subject to water phase trapping; or predominantly hydrocarbon and, as such, subject to hydrocarbon phase trapping. In some cases the water and hydrocarbons are present in substantially equal amounts. Information must be obtained regarding porous formation 12 by pilot wells, coring or the like. In the absence of the knowledge of the relative saturation of the porous formation, steps may be taken that actually exacerbate an existing problem.

Secondly, determining a preferential wettability of porous formation 12. As will hereinafter be further described, alcohol is going to be introduced into porous formation as part of this method. The alcohol selected must have solubility characteristics compatible with the predominant liquid in porous formation 12. When the predominant liquid is water, a water soluble alcohol must be used such as methanol, ethanol, propanol, butanol, and the like. When the predominant liquid is hydrocarbon, an oil soluble alcohol must be used, such as butanol. When water and hydrocarbons are equally predominant liquids, combined solubility mixtures of alcohols should be used.

Thirdly, determining potential damaging effects due to aqueous phase trapping as a result of increasing water saturation in porous formation 12. The present method is intended to address problems of "phase trap". Before instituting measures to address the problem, it is necessary to determine whether the potential problem exists in porous formation 12 and, if so, to what extent.

Fourthly, determining an alcohol type and concentration that will reduce severity of aqueous phase trapping. The knowledge of the preferential wettability of porous formation 12 helps to dictate the type of alcohol to be used. A determination has to be made as to the proper type or combination of alcohols and their most efficient concentrations, such that the effects of the phase trap are reduced or eliminated. In order to provide beneficial effects, the alcohol must be present in sufficient quantity. It is possible to achieve the desired effect through the use of one alcohol or a blend of several alcohols. The amount required to achieve beneficial effects may vary, but in no case should the amount of alcohol be less than 1%. There is no upper limit to the amount of alcohol that can be used. It is possible to obtain beneficial effects through the use of pure alcohol. It is preferred, however, that the drilling operations be conducted with an alcohol content in a narrower range of between 4% and 25%. The narrower range is preferred due to dilution and evaporative loss below this range and flammability considerations above this range.

Fifthly, incorporating the alcohol type and concentration into a drilling fluid 22 in mud tanks 20. The alcohol concentration will not be less than 1% of the volume of the drilling fluid as determined by weight.

Sixthly, pumping drilling fluid 22 containing the alcohol down a drilling string 16 to drill bit 18 during drilling operations.

Test results will now be described:

| PLUG | FLUID | K AIR | REGAIN PERM | DAMAGE | THRESHOLD PRESS | MAXIMUM PRESSURE |
|------|-------|-------|-------------|--------|-----------------|------------------|
| 15   | PROD CON   | 1.090000 | 0.710000 | −34.862 | 345  | 3448 |
| 17   | 25 METH    | 0.220000 | 0.150000 | −31.818 | 1034 | 3448 |
| 17   | ETH GLY    | 0.450000 | 0.310000 | −31.111 | 345  | 3448 |
| 17   | 5 nBUT     | 0.420000 | 0.360000 | −14.286 | 138  | 3448 |
| 17   | 5 IPA      | 0.580000 | 0.310000 | −46.552 | 345  | 3448 |
| 17   | DIESEL     | 0.250000 | 0.076000 | −69.600 | 345  | 3448 |
| 15B  | FRAC COND  | 0.434000 | 0.314000 | −27.650 | 345  | 3448 |
| 18A  | BRINE      | 0.170000 | 0.026000 | −84.706 | 345  | 3448 |
| 18A  | 25 METH    | 0.780000 | 0.750000 | −3.846  | 345  | 3448 |
| 18A  | 50 METH    | 0.780000 | 0.650000 | −16.667 | 345  | 3448 |
| 18B  | 5 nBUT     | 0.180000 | 0.120000 | −33.333 | 1034 | 3448 |
| 19A  | KCL        | 0.213000 | 0.059000 | −72.300 | 345  | 3448 |
| 19B  | SUP WET 500| 0.390000 | 0.070000 | −82.051 | 1034 | 3448 |

The above table provides a summary of fluid sensitivity tests which were prepared to demonstrate the utility of the present invention. The tests were conducted using glauconitic sandstone core plug samples from the Westerose gas field, located in central Alberta, Canada. The tests were conducted to determine the permeability of core plugs using various fluid types, as compared to an initial baseline permeability using a simulated formation brine. These results confirm that the use of alcohols improve the permeability of the core plug and thus decrease invasive formation damage. The results show benefits for alcohols of C1 (methanol) and greater. Since each alcohol causes a reduction in damage, blends can also be expected to reduce damage. Field application of Butanol with small quantities of Isopropanol and Pentanol have been successful.

It will be apparent to one skilled in the art that modifications may be made to the illustrated embodiment without departing from the spirit and scope of the invention as hereinafter defined in the claims.

The embodiment of the invention in which an exclusive property or privilege is claimed are defined as follows:

1. A method of reducing formation damage when drilling for oil and gas, comprising the steps of:
   determining initial water, hydrocarbon and gas saturation in a formation under consideration;
   boring a well through the formation with a drill string; and
   pumping a drilling fluid containing alcohol into the well while boring with the drill string, wherein the alcohol is (A) water soluble when the formation is predominantly water saturated, (B) water insoluble when the formation is predominantly oil saturated and (C) an equal mixture of a water soluble alcohol and a water insoluble alcohol when the formation is saturated equally with water and oil.

2. The method as defined in claim 1, in which the alcohol is present in an amount at least 1% by weight of the drilling fluid.

3. The method as defined in claim 1, in which the alcohol is present in an amount at least 4% by weight of the drilling fluid.

* * * * *